United States Patent [19]
Pina

[11] Patent Number: 5,636,594
[45] Date of Patent: Jun. 10, 1997

[54] PORTABLE CAT LITTER CASE AND TRAVEL KIT

[75] Inventor: Servando R. Pina, 1926 S. 51St. Ct., Cicero, Ill. 60650

[73] Assignee: Servando R. Pina, Cicero, Ill.

[21] Appl. No.: 464,098

[22] Filed: Jun. 5, 1995

[51] Int. Cl.⁶ .......................... A01K 29/00; A01K 1/035
[52] U.S. Cl. ..................... 119/165; 119/168; 119/170
[58] Field of Search ....................... 119/165, 168, 119/170

[56] References Cited

U.S. PATENT DOCUMENTS

| | | | |
|---|---|---|---|
| 3,831,557 | 8/1974 | Elesh | 119/170 |
| 4,279,217 | 7/1981 | Behringer | 119/170 |
| 4,646,684 | 3/1987 | Embry | 119/170 X |
| 4,779,567 | 10/1988 | Smith | 119/165 |
| 4,807,563 | 2/1989 | Berry et al. | 119/168 |
| 4,846,105 | 7/1989 | Caldwell | 119/168 |
| 4,932,360 | 6/1990 | O'Connor | 119/168 |
| 5,035,205 | 7/1991 | Schiller et al. | 119/165 X |
| 5,042,430 | 8/1991 | Casmira | 119/165 |
| 5,134,974 | 8/1992 | Houser | 119/168 |

Primary Examiner—Robert P. Swiatek
Assistant Examiner—Yvonne R. Abbott
Attorney, Agent, or Firm—Hill, Steadman & Simpson

[57] ABSTRACT

A portable cat litter box and travel case is disclosed wherein the portable box is comprised of two separate side compartments. One of the side compartments defines the litter box, and the second side defines a compartment within which various items necessary for proper pet care may be stored. The litter box has a substantially air tight sealing member removably secured to the top sidewall around its perimeter. Folding flanges are used to prevent a cat from inadvertently removing litter from the box upon exiting the litter box. Items which may be stored in the travel case include things such as extra food, spare liners for the litter box, a feeding bowl, etc.

12 Claims, 2 Drawing Sheets

PORTABLE CAT LITTER CASE AND TRAVEL KIT

BACKGROUND OF THE INVENTION

1. Field of the Invention

The present invention relates generally to the field of cat litter boxes and, more particularly, the present invention relates to an improved portable cat litter box and travel case.

2. Description of the Related Art

Cat litter boxes which are used as a depository for cat excrement are generally known in the art. Conventional cat litter boxes typically are comprised of a rectangular plastic box having an open top that exposes a defined region containing the cat litter. A cat thus has easy access to the litter and the cat can thus use the litter to bury its excrement. The cat litter may comprise, for example, a mixture of fluid absorbent material such as clay chips and the like. A cat litter box is a necessity for maintaining a cat in ones home.

The problem with conventional cat litter boxes is that they are typically not very portable. The movement of a conventional litter box from one location to another is often difficult and potentially a very messy undertaking. Conventional litter boxes are generally formed of plastic and are comprised of four side walls and a bottom. They generally do not have a top. The conventional design of litter boxes thus provides no mechanism for securing the litter within the box and preventing undesirable odors from escaping. This is a problem particularly when a cat owner wishes to travel from one location to another. If the pet owner wishes to bring the cat along to this second location, for any significant period of time, even for more than a few hours, it is necessary that the cat owner bring along the litter box.

This is a significant problem for conventional boxes which do not provide a mechanism for covering the litter. An uncovered cat litter box is potentially very messy for travel because the litter may easily spill out of the top and disperse on floors and the like. This is especially true if one is traveling in a car, where sudden stops may cause the litter to shift and easily spill out of a conventional litter box. Because the litter is made of granulated clay chips, spills of litter are also difficult to clean up. Additionally, because a conventional litter box remains uncovered, it is more likely that the litter will emit undesirable odors. Although litter is typically deodorized, the litter nevertheless often generates unpleasant odors.

Conventional litter boxes are also embarrassing to carry around because the general public knows what is contained in the box and people generally frown on the thought of one carrying around such an item. Thus, there is thus also a need for a portable cat litter box which is readily transportable, and which has a lid that seals to prevent the escape of undesirable odors. In any such design, it is desirable that the general public not readily recognize the item as being a litter box.

While others have proposed designs for portable litter boxes to solve the aboveidentified problems in the art, none of the existing solutions provide a portable litter box which provides satisfactory solutions to all of the known problems associated with portable litter boxes. One such portable litter container is disclosed in U.S. Pat. No. 5,134,974 issued to Raymond J. Houser. The Houser patent addresses some of the problems in the art, however, this design has numerous disadvantages.

The Houser reference discloses a portable cat litter box which is embodied in the form of a typical brief case. The litter box is formed in one half or side of the brief case. A top of the case that is mounted on hinges folds down to cover the litter box. The top thus covers the litter and prevents it from inadvertently spilling. One can thus easily transport the litter box without worrying about the litter accidently spilling from the box. The litter box is embodied as a typical brief case so it is not embarrassing to travel with the litter box because people will not readily recognize what is contained in the case. While the Houser reference addresses some of the known problems in the art, there are numerous disadvantages to this design.

In the Houser design, when the case is opened, a liner extends upward on two of the side walls and outward on the top which forms a wall on the back of the litter box. The liner simply folds over to contain the cat litter which is located within the case when one closes the case. Because the liner simply folds over, it is more susceptible to allowing the escape of unpleasant odors from the cat litter. Additionally, the litter may easily be removed accidentally by a cat that has used the box, upon exiting the litter box. It is known that the litter may temporarily cling to the cat's paws while leaving the box and become dislodged later away from the box. The cat may also inadvertently kick litter from the case while attempting to bury its excrement. This reference provides no mechanism for limiting the amount of litter that may be inadvertently removed from the case by the cat. Furthermore, this design is particularly susceptible to the inadvertent removal of litter due to the low profile of the walls which define the litter box. Also, because the side walls are so low, a cat may kick the litter out of the box.

Another problem with this reference is that it does not provide an adequate space for containing additional items which are required by the pet owner for travel with a cat. These items include such things as additional food for the cat, a bowl or dish for food and water and additional liners for the cat litter box. Additional travel items include such things as a litter scoop, and litter box deodorant, for example. The Houser reference discloses only a small storage area located between the top of the brief case and the litter box. The pet owner must therefore bring an additional bag or case to carry these items.

Thus there remains a need in the art for an improved portable cat litter box which is capable of conveniently transporting the litter box along with additional materials that are necessary for the travel with the cat.

SUMMARY OF THE INVENTION

The improved portable cat litter box of the present invention is comprised of a carrying case having two sides. Each of the sides define separate generally rectangular spaces. The two sides of the carrying case are temporarily secured to one another with detachable latch members that may be advantageously disengaged to allow the two case halves to be separated from one another. This is particularly useful for the pet owner upon arrival at the final destination because the travel case portion of the litter box need not be located with the litter box. The pet owner can thus store the additional pet paraphernalia at a location that is different than that of the litter box.

One of the sides of the carrying case defines the litter box which has a substantially air tight Rubbermaid or Tupperware type seal surrounding the top perimeter of this compartment. This seal keeps the litter within this compartment while traveling and prevents the escape of undesirable odors from the litter box. Folding flanges fold over and surround the air tight rubbermaid seal. The flanges are secured to the litter box with a thin plastic member that may be formed during the molding process as is known in the art. The flanges fold down so that the air tight seal may be removed in order to provide access to the litter once the owner arrives at a desired location. The flanges then fold up to define a guard which surrounds the top of the litter box to prevent the cat from inadvertently removing litter from the box when the cat leaves the box or when the cat is burying its excrement. When the owner wishes to travel again, the owner simply folds back the flanges and secures the air tight top. The flanges then fold up over the seal in order to allow the two case halves to mate with one another.

The other side of the carrying case defines a compartment within which various pet paraphernalia may be stored. The second compartment provides adequate space for securing various items which an owner may need for travelling with a cat. These items include such things as a bowl, extra food, spare litter box liners etc. The pet owner is able to remove the storage compartment side of the case from the litter box to separately store the remaining pet items at the final destination. Detachable latches temporarily secure the two case halves to one another to allow detachment of one half from the other. This is particularly advantageous because the litter box is thus able to stand alone in the new location without having the additional pet items hanging above the litter box. A handle is attached to a side of the portable litter box and travel case so that the pet owner may easily carry the portable litter box and travel kit.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
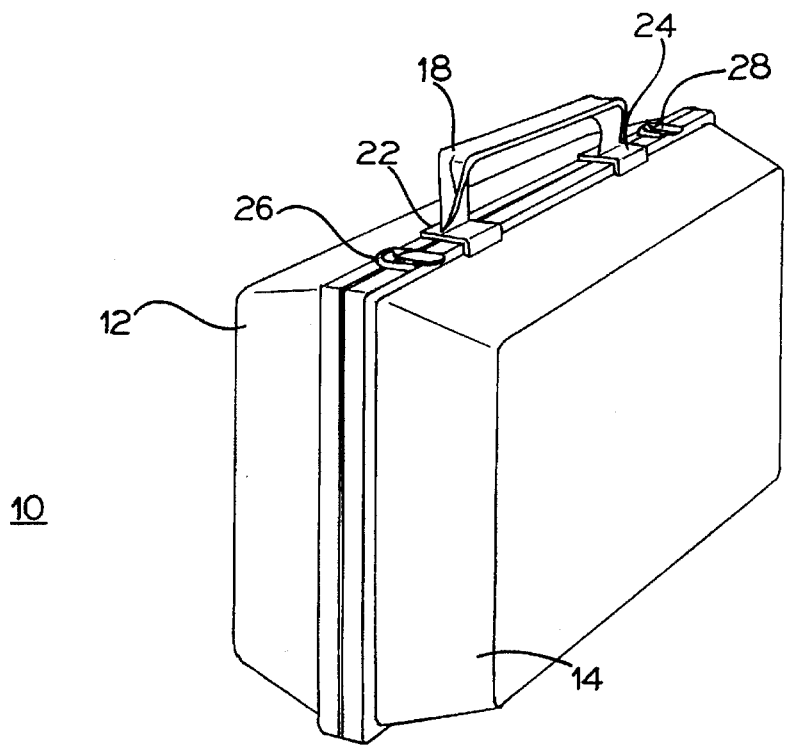
FIG. 1 illustrates a first embodiment of the present invention wherein the two sides of the litter box are secured to one another to form the travel case.

FIG. 1 illustrates the improved portable litter box and travel case of the present invention which is shown generally at 10. The carrying case has a first side compartment 12 and a second side compartment 14. Each of the respective side compartments are mated to one another and are secured with detachable latches.

The first side 12 is comprised of a rectangular compartment which defines the litter box. The second side 14 is comprised of a compartment within which there is ample space for storage of travel items for the pet. Each side compartment has a bottom and a surrounding side wall. The sidewall of each compartment is actually comprised of two sets of opposed side walls that define a substantial rectangular space. These sets of side walls form a perimeter side wall which defines the respective compartments. A handle 18 is centrally attached to the side of the portable litter box and travel case formed by the junction of the first and second sides 12 and 14. The handle may be either attached to a single side compartment alone or the junction of sides 12 and 14. Alternatively the handle may slidably engage the connection between the first and second sides 12 and 14, respectively as shown. The handle is attached with attachment members 22 and 24. In the preferred embodiment the entire case including the handle is molded from plastic. The handle 18 may be molded into one of the sides 12 or 14.

Four latch members, only two of which are shown, 26 and 28 secure the first and second sides 12, 14 of the portable litter box and travel case to one another. Two additional latches which are not shown are located opposite the locations of latches 26 and 28. The latches 26 and 28 provide for temporarily securing first and second side compartments 12 and 14 to each other. When the latches 26, 28 are disengaged, the two sides may be separated and the travel case portion therefore need not be located with the litter box side.

Figure 2:
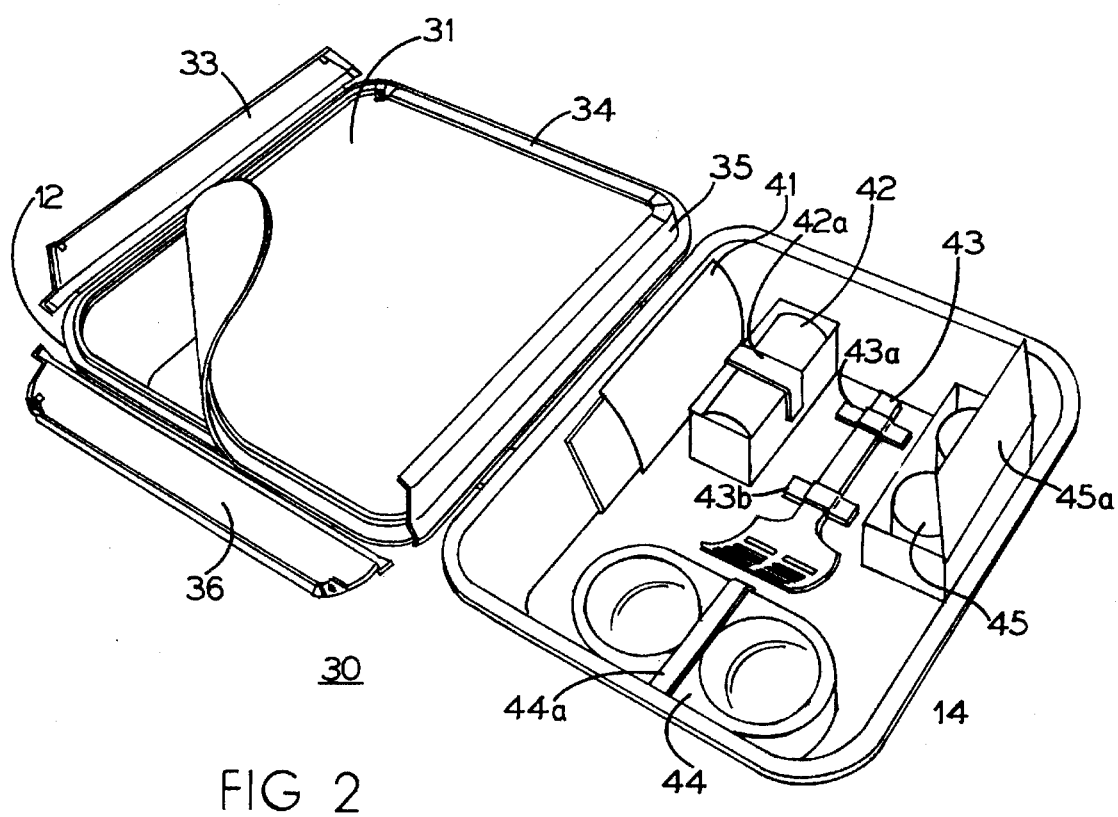
FIG. 2 illustrates the preferred embodiment of the present invention wherein the case is opened to show the separate litter box and travel case compartment.

FIG. 2 illustrates a plan view of the improved portable litter box and travel kit in an unfolded or open condition shown generally at 30. A removable substantially air tight seal is secured to the upper perimeter side wall of the litter box side 12 of the improved portable litter box and travel kit of the present invention. The substantially air tight seal member 31 may be similar to those manufactured by Rubbermaid, Inc. or Tupperware. The air tight seal member 31 secures the litter within the rectangular compartment defined by wall members of the first side of the portable litter box 12. Additionally, the substantially air tight seal member 31 also prevents the escape of unpleasant odors from the cat litter.

FIG. 2 illustrates the substantially air tight seal member 31 in a partially opened or detached condition. Folding flanges 33, 34, 35 and 36 fold up to cover the air tight seal member 31 and fold down to allow access and removal or replacement of the air tight seal member 31. The flanges are attached to the litter box compartment with a thin plastic member which may be formed during the molding process. This thin plastic member allows each of the flanges to fold up and down but yet remain attached to the litter box. Once the seal member 31 is removed from the top of the litter box, folding flanges 33, 34, 35 and 36 are folded up again to provide a barrier which substantially reduces the amount of litter which may be inadvertently removed by a cat from the litter box. The flanges snap fit together as is known in the art.

The second side 14 of the portable litter box and travel kit defines a rectangular compartment within which various items for care of a cat while traveling may be stored. These items include such things as additional litter box liners 41, deodorant 42, litter scoop 43, additional food 45 and a feeding bowl 44.

FIG. 2 also illustrates means for securing the various additional items into the travel case portion of the portable litter and travel case of the present invention. In a preferred embodiment plastic straps with snaps or Velcro are used to secure the items within the travel case. For example strap 42a secures the deodorant 42, straps 43a and 43b secure the litter scoop 43, strap 44a secures the feeding bowl and a separate enclosure 45a secures the additional food containers.

Figure 3:
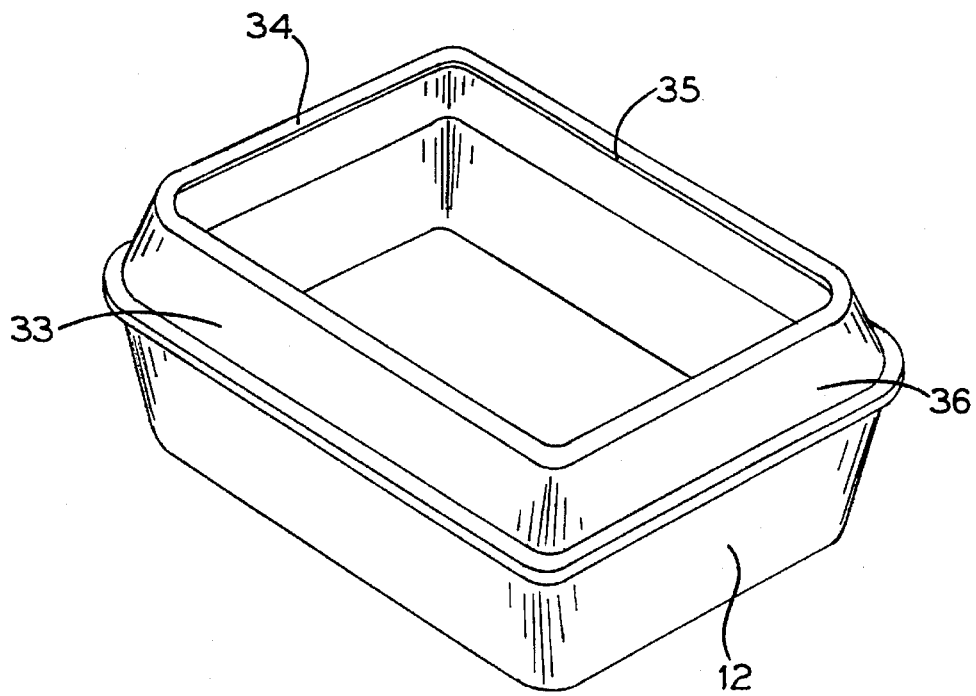
FIG. 3 illustrates the litter box side of the portable litter box and travel case of the present invention opened and separated from the travel case.

FIG. 3 illustrates a view of the first side 12 of the portable litter box in a detached condition from the storage compartment 14. In this illustration, it is apparent that the substantially air tight seal member 31 is removed from the upper perimeter of the litter box so that a cat may have access to litter which is contained within the rectangular compartment defined by the first half of the carrying case 12. The flanges 33, 34, 35 and 36 are shown in a upwardly folded snap-fit condition. The flanges 33, 34, 35 and 36 are angled inward and aid in preventing inadvertent removal of the cat litter from the litter box 12.

Figure 4:
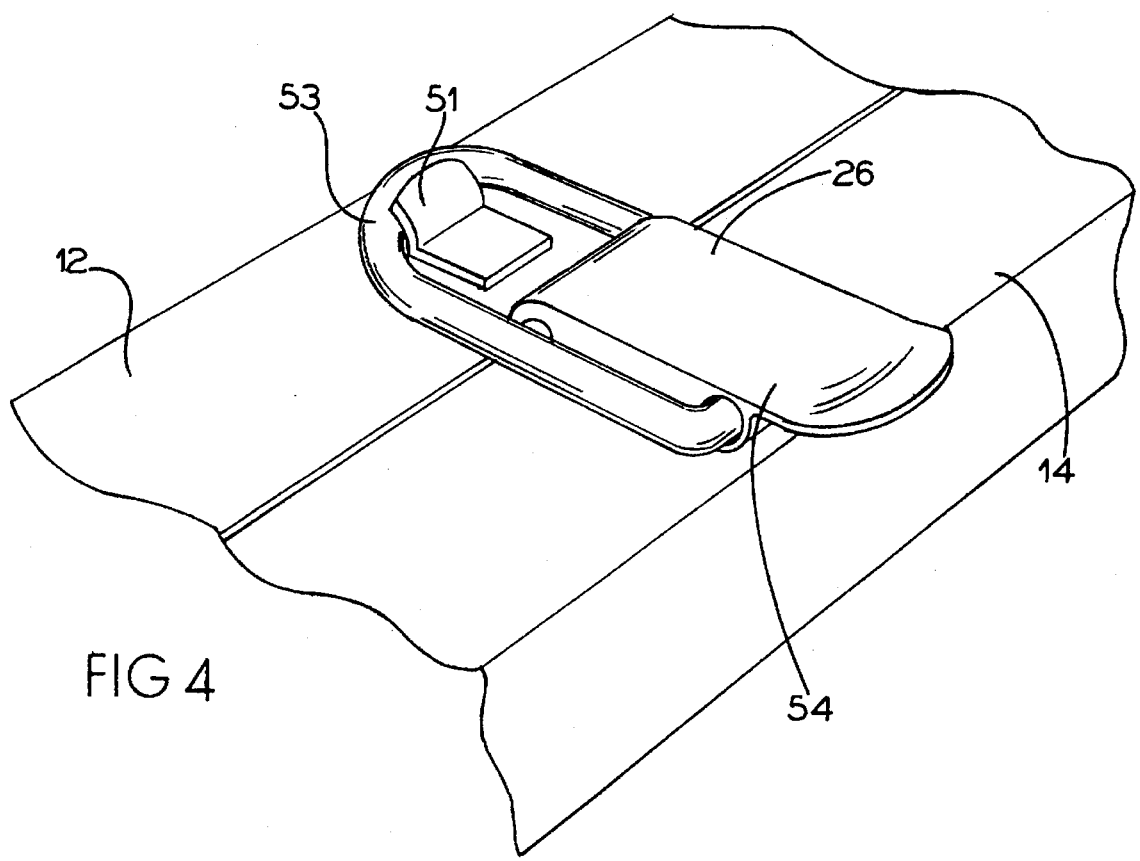
FIG. 4 illustrates one of the latches which are used to temporarily secure the two sides of the portable litter box and travel case of the present invention.

FIG. 4 illustrates the detachable latch mechanism 26 used to connect the first and second sides 12 and 14 of the improved portable litter box and travel case of the present invention. In a preferred embodiment, the detachable latch member 26 is comprised of a hook member 51 which is molded into a side of the portable case. The hook member is desirably formed in the shape of a one-quarter circle. The hook member 51 mates with a locking ring member 53. The locking ring member 53 is mounted on hinge member 54 which is rotatably mounted to the side of the case opposite the side to which the hook is attached. This detachable latch member 26 will be recognized by those skilled in the art as a latch which is widely used. It is easily recognized that any alternate design for the detachable latch will operate equally as well. In a preferred embodiment of the present invention the entire portable litter box and travel case of the present invention is formed from molded plastic.

In a preferred embodiment the sidewalls of the carrying case and litter box may be decorated with colorful designs which disguise the carrying case so that it is not recognized as being a litter box. Alternatively the designs may decorate the travel case with pictures of cats and the like.

The present invention is subject to many variations modifications and changes in detail. It is intended that all matter described throughout the specification an shown in the accompanying drawings be considered illustrative only. Accordingly, it is intended that the invention be limited only by the spirit scope of the appended claims.

I claim:

1. A portable litter box and travel case comprising:

a first side compartment and a second side compartment;

the first side compartment further comprised of a bottom wall;

a first side compartment perimeter wall extending substantially perpendicular to the first side bottom wall around a perimeter of the first side bottom wall;

a planar sealing member detachably secured to a top of the first side compartment perimeter wall and being in sealing engagement substantially along all edges of a top of the perimeter wall;

at least one folding flange attached to the top of the first side compartment perimeter wall;

the second side compartment further comprised of a bottom wall;

a second side compartment perimeter wall extending substantially perpendicular to the second side bottom wall around a perimeter of the second side bottom wall; and a plurality of detachable latches affixed between the first side compartment and the second side compartment for connecting the first side compartment to the second side compartment.

2. The portable litter box and travel case of claim 1 wherein the first side compartment perimeter wall is comprised of two sets of opposite substantially parallel walls forming a rectangular compartment.

3. The portable litter box and travel case of claim 1 wherein the second side compartment perimeter wall is comprised of two sets of opposite substantially parallel walls forming a rectangular compartment.

4. The portable litter box and travel case of claim 1, further comprising at least one strap attached to the second side compartment for securing a feeding bowl.

5. A portable litter box and travel case comprising:

a first side compartment and a second side compartment;

the first side compartment further comprised of a bottom wall;

a first side compartment perimeter wall extending substantially perpendicular to the first side bottom wall around a perimeter of the first side bottom wall;

a planar sealing member detachably secured to a top of the first side compartment perimeter wall;

at least one folding flange attached to the top of the first side compartment perimeter wall having a portion which folds over the sealing member;

the second side compartment further comprised of a bottom wall;

a second side compartment perimeter wall extending substantially perpendicular to the second side bottom wall around a perimeter of the second side bottom wall; and a plurality of detachable latches affixed between the first side compartment and the second side compartment for connecting the first side compartment to the second side compartment.

6. The portable litter box of claim 5, wherein the first side compartment perimeter wall is comprised of two sets of opposite substantially parallel walls forming a substantially rectangular compartment.

7. The portable litter box of claim 6, wherein the second side compartment perimeter wall is comprised of two sets of opposite substantially parallel walls forming a substantially rectangular compartment.

8. The portable litter box of claim 5, further comprising at least one strap attached to the second side compartment for securing a feeding bowl.

9. A portable litter box and travel case comprising:

a first side compartment and a second side compartment;

the first side compartment further comprised of a bottom wall;

a first side compartment perimeter wall extending substantially perpendicular to the first side bottom wall around a perimeter of the first side bottom wall;

a planar sealing member detachably secured to a top of the first side compartment perimeter wall and being in sealing engagement with a top of the perimeter wall;

at least one folding flange attached to the top of the first side compartment perimeter wall having a portion which folds over the sealing member;

the second side compartment further comprised of a bottom wall;

a second side compartment perimeter wall extending substantially perpendicular to the second side bottom wall around a perimeter of the second side bottom wall; and a plurality of detachable latches affixed between the first side compartment and the second side compartment for connecting the first side compartment to the second side compartment.

10. The portable litter box of claim 9, wherein the first side compartment perimeter wall is comprised of two sets of opposite substantially parallel walls forming a substantially rectangular compartment.

11. The portable litter box of claim 9, wherein the second side compartment perimeter wall is comprised of two sets of opposite substantially parallel walls forming a substantially rectangular compartment.

12. The portable litter box of claim 9, further comprising at least one strap attached to the second side compartment for securing a feeding bowl.

* * * * *